March 27, 1956   C. G. WALLMAN   2,739,692
CONVEYOR ARRANGEMENT
Filed May 20, 1950   4 Sheets-Sheet 1
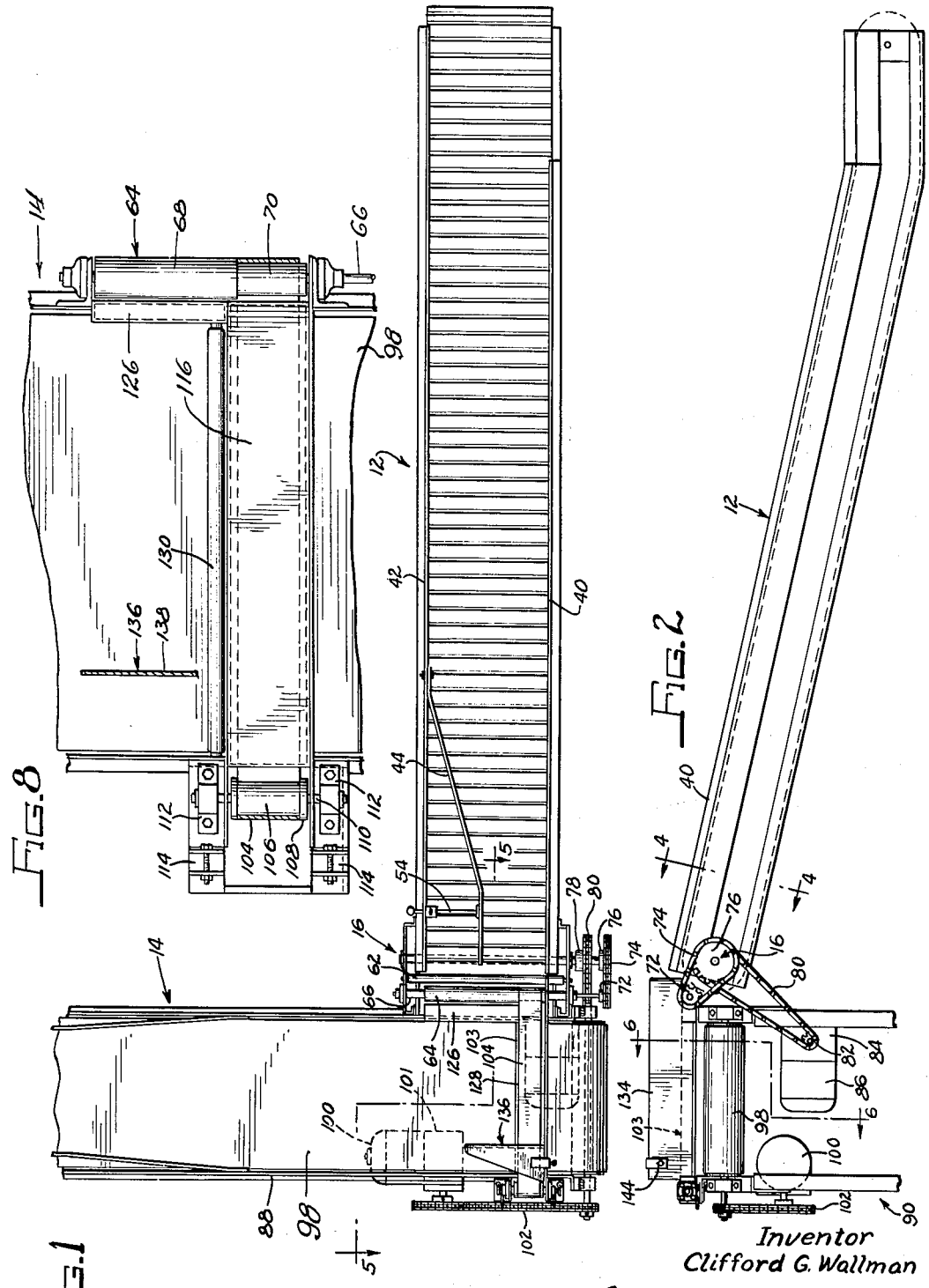
Inventor
Clifford G. Wallman
by: Bair, Freeman & Molinare
attys.

March 27, 1956  C. G. WALLMAN  2,739,692
CONVEYOR ARRANGEMENT
Filed May 20, 1950  4 Sheets-Sheet 2
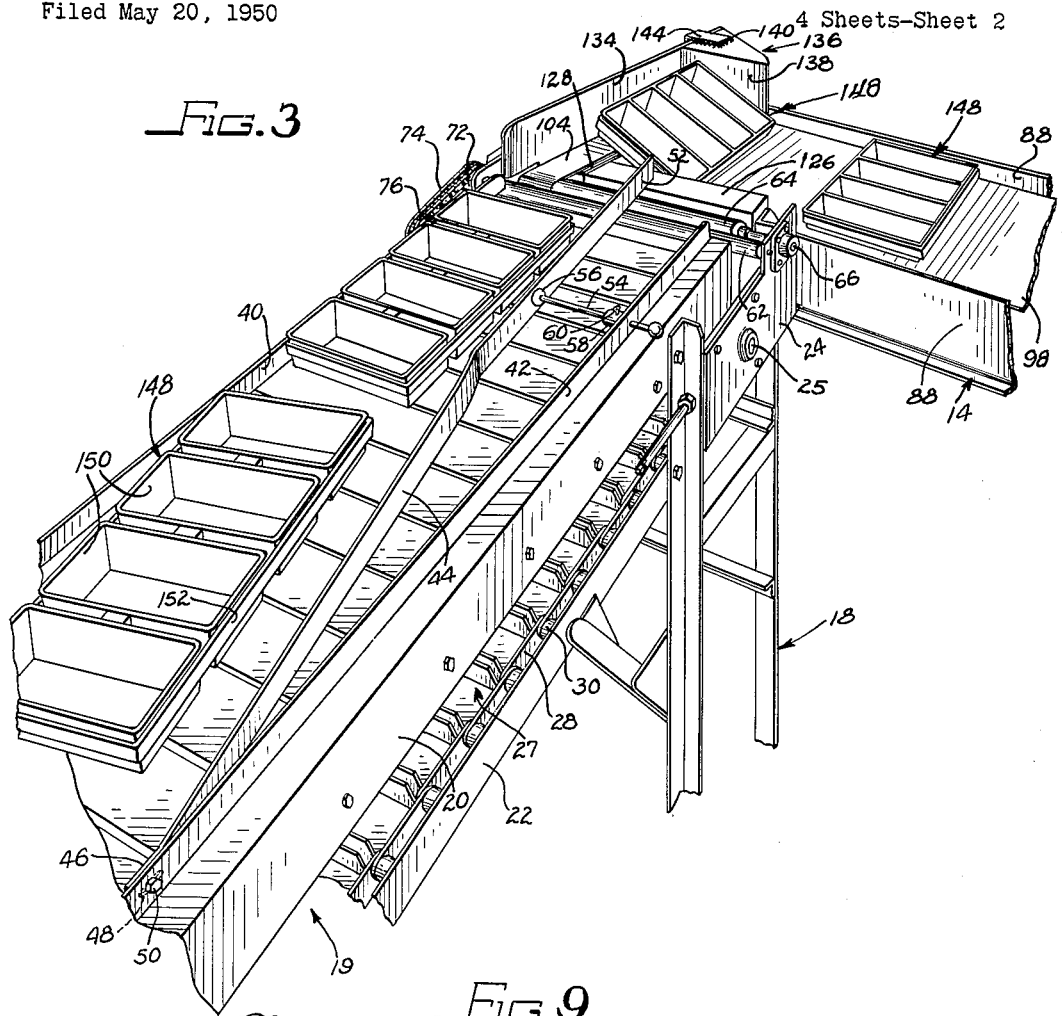
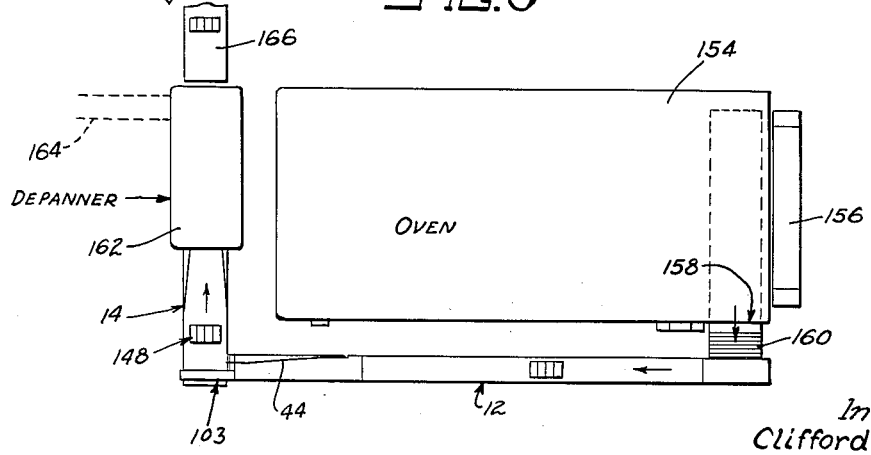
Inventor
Clifford G. Wallman
by: Bair, Freeman & Molinare
Attys.

March 27, 1956  C. G. WALLMAN  2,739,692
CONVEYOR ARRANGEMENT
Filed May 20, 1950  4 Sheets-Sheet 3
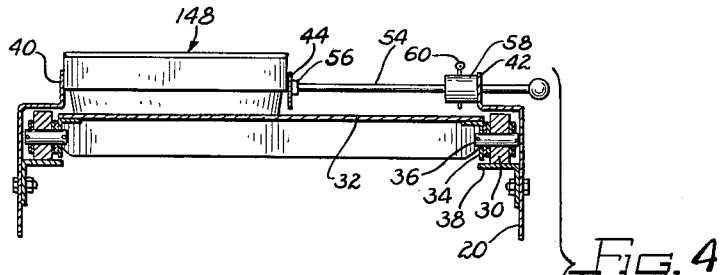
Fig. 4
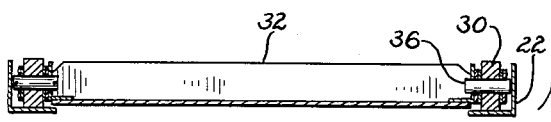
Fig. 5
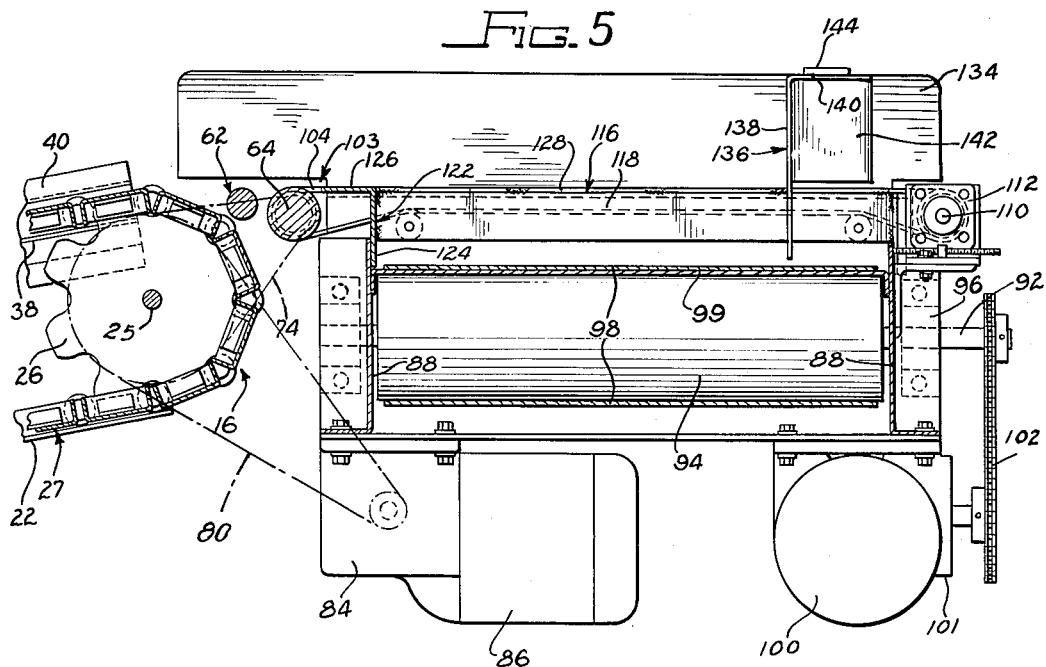
Inventor
Clifford G. Wallman
by: Baird, Freeman & Molinare
Attys.

March 27, 1956     C. G. WALLMAN     2,739,692
CONVEYOR ARRANGEMENT
Filed May 20, 1950     4 Sheets-Sheet 4

*Inventor*
*Clifford G. Wallman* by: *Bair, Freeman & Molinare*
*attys.*

2,739,692

CONVEYOR ARRANGEMENT

Clifford George Wallman, La Grange, Ill., assignor to The Petersen Oven Company, Franklin Park, Ill., a corporation of Illinois Application May 20, 1950, Serial No. 163,197

2 Claims. (Cl. 198—20)

The present invention relates to a conveyor arrangement including conveyors disposed at an angle to each other and effective for the transfer of articles from one conveyor to the other while retaining the articles in the position they originally assumed on the first conveyor.

It is often necessary to arrange successive, intercooperating conveyors at an angle to each other because of the shape of the building in which the conveyors are disposed, or because of the shape of the floor space available, and it is also often necessary to maintain the articles conveyed in a certain fixed predetermined position throughout their travel on the conveyors.

One of the situations to which the present invention is applicable is in the case of bakeries, although it is to be understood that the invention is not limited thereto. Pans containing loaves of bread are run through an oven and then through a depanner for emptying the loaves out of the pans. The depanner is so constructed that the pans must be introduced onto the depanner in a certain predetermined position so that the depanner will perform its intended function. It is therefore necessary that the pans containing the loaves of bread are properly aligned on the conveyor leading to the depanner, and in those cases where it is necessary to have a conveyor leading to the depanner, in an arrangement in which the conveyors are disposed at an angle to each other, it is necessary that the pans be transferred from the first conveyor to the second conveyor in properly and accurately aligned position.

More specifically, the pans are positioned on the second conveyor and oriented as on the first conveyor but travel in a different direction with respect to their position on the second conveyor relative to the first conveyor.

The angle between successive conveyors in such an arrangement is usually an abrupt angle, e. g., a right angle, and it would be exceedingly difficult, if not impossible, to transfer articles from a first conveyor to a second conveyor in the proper position, without the device of the present invention.

An object therefore of the present invention is the provision of means for transferring articles from a first conveyor to a second conveyor arranged at an angle with respect to each other in such manner that the articles are properly aligned and oriented on the second conveyor after the transfer.

More specifically, an object of the invention is the provision of an arrangement of conveyors having a first and second conveyor disposed at an angle to each other, wherein the articles conveyed are carried from the delivery end of the first conveyor by a transfer conveyor, up to a position above the second conveyor, and in which the transfer conveyor is of less transverse dimension than the first conveyor, so that the articles, after being conveyed to the position referred to, tip off of the transfer conveyor onto the second conveyor.

Another object of the invention is the provision of an arrangement of the character just referred to in which the transfer conveyor travels at a greater speed than the first conveyor so that the articles are rapidly carried to the transfer position so that they will be conveyed away by the second conveyor before successive articles on the first conveyor have an opportunity to collide with articles theretofor transferred to the second conveyor—compensating for the fact that the direction of movement on the second conveyor is transverse to the movement on the first conveyor.

Still another object of the present invention is the provision of an arrangement of conveyors of the character just referred to in which guide means is provided on the first conveyor for properly aligning and guiding the articles into position for engagement by the transfer conveyor, whereby when the articles are carried up to the position above the second conveyor they are in properly aligned position for descending onto the second conveyor.

A further object is the provision of a method of transferring an article from a first conveyor to a second conveyor disposed at an angle thereto, which consists in carrying the article from the first conveyor to a position above the second conveyor, supporting the article during the carrying movement adjacent one side thereof, so that the article overhangs an axis disposed longitudinally of the first conveyor and transversely of the second conveyor, supporting the overhanging portion until the article reaches said position, after which the overhanging portion overbalances the supported portion and the article descends onto the second conveyor.

With these and other objects in view, my invention consists in the construction, arrangement and combination of the various parts of my device whereby the objects contemplated are attained as hereinafter more fully set forth, pointed out in the claims and illustrated in the accompanying drawings in which:

Figure 1 is a plan view of the conveyor arrangement illustrating the conveyors disposed at an angle with respect to each other;

Figure 2 is a side view of Figure 1 taken from the side next the observer;

Figure 3 is an enlarged perspective view of the adjoining portions of the conveyors of the conveyor arrangement;

Figure 4 is an enlarged sectional view taken on line 4—4 of Figure 2;

Figure 5 is an enlarged sectional view taken on line 5—5 of Figure 1;

Figure 6 is an enlarged sectional view taken on line 6—6 of Figure 2;

Figure 7 is a view similar to Figure 6, showing a modified form of transfer conveyor and the means thereon over which the articles slide;

Figure 8 is an enlarged view of the transfer conveyor showing certain details of construction thereof, and Figure 9 is a diagrammatic layout of bakery apparatus including a conveyor arrangement embodying the present invention.

Referring in detail to the drawings, and particularly Figures 1, 2 and 3 thereof, numeral 12 indicates a conveyor which may be referred to as the first conveyor or approach conveyor. The numeral 14 indicates a second or take-away conveyor, the conveyors being arranged at a right angle with respect to each other, with the delivery end of the first conveyor 12 as indicated at 16 disposed adjacent the side of the second conveyor 14. The first conveyor is arranged with its top operating surface adjacent to and above the top of the second conveyor 14, for the delivery of articles thereonto.

The first conveyor 12 may be of any desired construction, the construction here illustrated including a support or stand 18 supporting one end of a framework 19 which includes an upper portion 20 and a lower portion 22. Side frame members such as plates 24 are secured to the top of the stand 18 and provided with bearings for journaling a shaft 25 extending across the conveyor. Mounted on the shaft are appropriate sprocket wheels 26 (Figure 5) over which is trained an endless conveyor belt 27 having chains 28. The upper and lower runs of the conveyor are supported on tracks in the upper and lower parts 20 and 22 respectively of the frame 19. The chains 28 include rollers 30 and steel slats 32 which may be in the form of channels (Figures 4 and 5). Secured to each end of each slat 32 is an angle piece 34 having one leg welded to the slat and the other leg supporting a pin 36, the pins being mounted in the rollers 30; the chains are completed by links pivoted on and interconnecting the pins. The upper portion 20 of the conveyor frame on each side of the conveyor is provided with an angle member 38 extending longitudinally and forming a track for the upper run of the conveyor belt, and the lower portion 22 of the frame is in the form of an angle (Figure 4) forming tracks for the return or bottom run of the conveyor belt. The opposite end of the framework 19 may be supported by a supporting means similar to the stand 18.

For purposes of convenience, the numerals 40 and 42 are applied to side flanges on the conveyor 12 extending above the upper run of the conveyor belt. The flange 40 operates as one element of a guide means for guiding the articles being conveyed on the conveyor. Another guide means is indicated at 44 and consists of an elongated bar or strip having one end as indicated at 46 provided with a slot 48 for receiving a bolt 50 extended through a hole in the flange 42. The end 46 of the guide 44 is adapted to have limited longitudinal movement with respect to the flange 42 by virtue of the slot 48 and bolt 50. The guide 44 is adapted to extend diagonally in toward the middle of the conveyor, and its extended end as indicated at 52 terminates adjacent the delivery end of the conveyor. Adjusting means is indicated at 54 which includes a rod having a ball and socket connection 56 with the guide 44, and extends through a bushing 58 secured to the flange 42, and through a hole in the flange. A pin or key 60 is inserted through a hole in the bushing and the rod 54 for locking the rod in adjusted position, the rod being adapted for adjusting the extended end of the guide 44 in the desired spaced relation to the flange 40 on the opposite side of the conveyor.

An idler roller 62 extending transversely across the conveyor 12, is mounted in the plates 24 just beyond the delivery end of the conveyor belt.

Just beyond the roller 62 is another roller 64 mounted on a shaft 66 supported in bearings mounted on the side plates 24. The roller 64 is shown in detail in Figure 8 and includes a main portion 68 of relatively large diameter and a portion 70 of reduced diameter. The roller 64 will be referred to later in connection with the transfer conveyor for transferring the articles from the first conveyor 12 to the second conveyor 14. The shaft 66 of the roller 64 extends beyond one of the plates 24 and is provided with a sprocket 72 over which is trained a drive chain 74, the chain also being trained over a sprocket 76 on the adjacent end of the shaft 25. The shaft 25 is also provided with another sprocket 78 over which is trained a drive chain 80, the latter being driven by a sprocket 82 mounted on the drive shaft of a speed reducer 84 driven by an electric motor 86. The motor 86 may be mounted in any convenient location such as on the frame work of the conveyor 14. The drive for the power roller 64 and conveyor 12 is such that the peripheral speed of the roller is greater than that of the conveyor belt for a purpose to be referred to later.

The conveyor 14 for the most part is a conventional conveyor and includes a framework having side frame members 88 supported by a supporting structure such as 90 (Figure 2). A shaft 92 on which is mounted a roller 94 is mounted in bearings 96 on the side frame members or on supporting structure of the conveyor 14.

Trained over the roller 94 is an endless belt 98 which may be of any preferred type such as, for example, canvas or wire mesh. One end of the endless belt is shown in the drawings, and it will be understood that the opposite end of the conveyor belt is mounted on a similar roller. The end of the conveyor 14 illustrated in the drawings is the receiving end thereof. As illustrated, the conveyor 14 slopes downwardly toward its delivery or discharge end, but it may, of course, be level. Under the upper run of the conveyor belt 98 is a plate 99 extending transversely across the conveyor and supported by the side frame members 88, the plate also extending substantially the full length longitudinally of the conveyor for supporting the upper run of the conveyor and the articles placed thereon. A drive motor 100 and speed reducer 101 are mounted on the structure of the conveyor 14, for driving the conveyor belt 98; the drive is transmitted through a chain 102 trained over sprockets on the power transmitting shaft of the speed reducer, and the shaft 92.

Reference to Figure 5 will show to best advantage the relationship between the delivery end of the first conveyor 12 and the second conveyor 14. The endless conveyor belt 27 of the conveyor 12 terminates adjacent the side of the conveyor 14 in a position above the top run of the conveyor belt 98. It will also be noted that the rollers 62 and 64 are arranged with their uppermost points substantially level with the uppermost point reached by the conveyor belt 27.

The roller 64 as above noted is mounted in the end of the structure of the conveyor 12 and, as noted in Figure 5 particularly, is adjacent the side of the conveyor 14. The roller 64 is part of a transfer conveyor referred to generally at 103, which includes an endless belt 104 which may be made of desired material such as fabric, and it preferably possesses a high coefficient of friction. The belt 104 extends transversely across the conveyor 14 and its other end is trained over the idler pulley 106 having guide flanges 108 at its ends. The pulley 106 is mounted on a shaft 110 journaled in bearings 112 which in turn are mounted on a support such as 114 mounted on the adjacent side frame member 88 of the conveyor 14. The upper run of the transfer conveyor belt 104 is supported by the upper flat surface of an inverted channel 116, the channel having flanges 118. The channel is supported at one end by vertical members 120 welded to the adjacent side frame member 88 of the conveyor 14, and at the opposite end by what may be termed a ledge or shelf element 122. The element 122 is in the form of an angle member having a vertical leg 124 welded to the adjacent side frame member 88 and an upper horizontal leg 126 extending outwardly from the conveyor 14 or toward the first conveyor 12. The upper horizontal leg 126 forms a shelf proper and is disposed slightly above the level of the top surface of the channel 116, and preferably at or only very slightly below the top surface of the transfer conveyor belt 104. The extended edge of the shelf 126 is adjacent the roller 64 and is of relatively minor dimension in a direction longitudinally of the first conveyor 12, but extends from the transfer conveyor belt 104 transversely across the end of the first conveyor 12. The shelf 126, the upper surface of conveyor belt 104, and the uppermost point of the roller 64 lie in a common plane. The reduced portion 70 of the roller 64 is of such diameter that the outer surface of the transfer conveyor belt 104 is flush with or has the same diameter as the large portion 68 of the roller.

A bead 128, which may be of key stock, is welded to the upper surface of the channel 116 adjacent the conveyor belt 104, the bead having a height equal to the thickness of the conveyor belt 104, and therefore the upper surface of the bead lies in the plane of the upper surface of the shelf 126. The bead 128 extends transversely across the conveyor 14, or substantially the longitudinal length of the transfer conveyor 104.

A modified form of element corresponding to the bead 128 is shown in Figure 7, in which instead of a fixed bead, a roller 130 is provided. This roller is also shown in Figure 8 and may be supported at one end by the vertical leg 124 of the shelf element 122, and at the opposite end in the adjacent side frame member 88. As shown in Figure 7, the upper surface of the roller 130 is substantially coincident with the upper surface of the conveyor belt 104. If desired, the return run of the conveyor belt 104 is supported by a series of rollers 132 which are journaled in the flanges 118 (Figures 6 and 7).

The transfer conveyor 103 is disposed in longitudinal alignment with the first conveyor 12 and transversely of the second conveyor 14; the transfer conveyor is of considerably less transverse dimension than the conveyor 12, and is disposed adjacent one side of the longitudinal projection of the conveyor 12. Adjacent the outer side of the transfer conveyor 103 is a guide plate 134 disposed vertically and substantially in alignment with the guide flange 40 on the first conveyor 12. The plate 134 is supported in any desired manner, such as by welding it to the adjacent flange 118 of the channel member 116. The plate 134 preferably extends from adjacent the end of the flange 40 to the opposite side of the second conveyor 14.

A stop means is indicated generally at 136, which includes a vertical plate member 138 disposed perpendicular to the guide plate 134, an overturned top horizontal portion 140 and a piece 142 welded to the first two portions. The piece 142 is adapted to abut against the guide plate 134 by means of which the element 138 is retained perpendicular to the guide 134. An angle piece 144 is disposed with one leg welded to the top surface of the piece 140 and its other leg extending vertically on the outside of the guide plate 134 where an adjusting screw 146 is threaded in a tapped opening therein for engagement with the plate guide element 134. The stop 136 is thus adjustable longitudinally of the transfer belt 103 and can be fixed in adjusted positions by the set screw 146.

The numeral 148 indicates what is termed a pan strap in the bakery trade. Each pan strap includes a plurality of pan elements 150, in this case four in number, which are arranged in side-by-side relationship and bound together in a unit by a surrounding strap 152. Each pan strap is handled as a unit, although containing four pan elements and accommodating four loaves of bread. In bakery apparatus such as a depanner, it is necessary that the pan straps be introduced into the depanner in accurately aligned position so that when the pan straps are inverted, they are turned onto supporting bars that register with the spaces between the pan elements 150 whereby the loaves of bread are not injured by contacting such bars.

The diagrammatic layout of Figure 9 illustrates to best advantage the arrangement of conveyors as applied to bakery apparatus. A baking oven is indicated at 154, having a loading station at 156 and a discharge station at 158 where the pan straps are delivered by means of a conveyor 160 onto the first conveyor 12 referred to above. The second conveyor 14 as indicated is disposed at a right angle to the conveyor 12 and leads to a depanner 162. When the loaded pan straps are emptied by the depanner, the loaves of bread are delivered onto a conveyor indicated at 164, while the empty pan straps are discharged onto a conveyor 166. It will be noted in Figure 9 that the pan strap 148 is positioned on the second conveyor 14 so that the individual pan elements 150 are directed longitudinally of the conveyor. It is in this position that the pan straps are introduced into the depanner, and this same position is shown in the upper right-hand corner of Figure 3. The pan straps proceed up the first conveyor 12 in the position shown in the left of Figure 3, and the guide means 44 is adjusted to such position relative to the flange 40 on the opposite side of the conveyor that the pan straps are guided over against the flange 40 to be positioned on that side of the conveyor. As the pan straps proceed up the first conveyor 12 and ride off the conveyor belt, they engage the idler roller 62, which aids in the movement of the pan straps until they engage the power roller 64 and the transfer conveyor belt 104. The roller 64 and belt 104 together carry the pan straps into a position above the second conveyor 14, and it is to be noted that the width of the conveyor belt 104 is less than half of the width of the pan straps in that direction, so that the portion of each pan strap that is supported is less than the overhanging portion and when the support for the overhanging portion is no longer effective, the overhanging portion over-balances the supported portion and the pan strap descends onto the conveyor belt 98 of the second conveyor. As the pan strap moves up into the position referred to, the shelf 126 supports the overhanging portion so that each pan strap is provided with three-point support, namely one point by the shelf and two points by the transfer conveyor, the two points on the conveyor being adjacent the respective ends of the pan strap unit. The peripheral speed of the power roller 64 and conveyor belt 104 is sufficiently fast that the pan strap is carried at a great enough speed whereby any irregular contour in the vertical surface at the trailing end of the pan strap does not drag on the shelf 126 as the pan strap descends onto the second conveyor, and interruption of the alignment from that source is eliminated. Because the peripheral speed of the roller 64 is greater than the speed of the conveyor 12, the pan straps are carried away from the end of the conveyor 12 and permitted to be conveyed away by the conveyor 14 before succeeding pan straps have opportunity to collide with any pan straps already on the conveyor 14, whereby possibility of misalignment from this source is avoided.

The stop 136 checks the movement of the pan strap so that when it reaches the desired position it immediately tips onto the second conveyor. The extended end 52 of the guide 44 assures that the pan strap will have contact engagement with the guide plate 134 so that the pan strap is properly and accurately aligned on the transfer conveyor for proper alignment when discharged directly onto the second conveyor. The pan strap tips off of the transfer conveyor on a line or axis perpendicular to the second conveyor, eliminating any angular misalignment of the pan strap on the second conveyor.

The bead 128 normally is sufficiently frictionless to enable the pan strap to slide over onto the second conveyor. However, the roller 130 assures that there will be no drag as the pan strap slides thereover. The upper surface of the bead 128, or the roller 130, being substantially in register with the upper surface of the conveyor belt 104, assures that upon the slightest tipping of the pan strap the formerly supported portion is completely out of contact with the transfer conveyor belt 104 and there is then no drag by the belt on the pan strap, and thus there is avoided any possible misalignment of pan straps when discharged onto the second conveyor.

As mentioned above, the conveyors 12 and 14 are illustrated as being at right angles with respect to each other. However, the device of the present invention is effective in connection with conveyors that may not be disposed exactly at 90° angles, and the device is effective for transferring articles from one conveyor to another, that are disposed at angles other than 90°.

While the foregoing specification emphasizes pan straps as the articles being handled, the conveyor arrangement embodying the present invention is adapted for use in conveying articles of any character where it is desired to retain the articles in a certain predetermined position or alignment.

While I have herein shown and described a preferred embodiment of my invention, it will be understood, of course, that I do not wish to be limited thereto, since many modifications may be made; and I therefore, contemplate by the claims appended thereto to cover any such modification or substitutions of mechanical equivalents as fall within the true spirit and scope of the claims.

I claim:

1. In an article transferring conveyor apparatus, a first conveyor and a second conveyor disposed at an angle with respect to each other, the delivery end of said first conveyor being adjacent and above the side of said second conveyor, a roller extending transversely of said first conveyor adjacent and in register with the discharge end thereof, one end of said roller having a reduced portion adjacent one end, a transfer belt conveyor trained on said reduced end and forming a longitudinal extension of said first conveyor, the outer surface of said transfer belt conveyor being substantially flush with the outer surface of the large portion of said roller, said transfer belt conveyor extending transversely of said second conveyor and disposed above said second conveyor a distance less than the transverse dimension of the article when traveling on the first conveyor.

2. In conveyor apparatus, a first conveyor and a second conveyor disposed at an angle with respect to each other, said second conveyor having side frame members, said first conveyor having its delivery end adjacent the side of said second conveyor, a plate secured to the side frame members of said second conveyor and extending transversely thereacross, a transfer belt conveyor having its upper run on said plate, said transfer conveyor forming a longitudinal continuation of said first conveyor and being of less transverse dimension than said first conveyor, and an elongated member mounted adjacent one side of said plate, the upper surface of said elongated member being substantially in register with the upper surface of the upper run of said transfer conveyor.

References Cited in the file of this patent

UNITED STATES PATENTS

| 1,160,791 | Van Houten | Nov. 16, 1915 |
| 1,838,193 | Rundell | Dec. 29, 1931 |
| 1,909,481 | Allen | May 16, 1933 |
| 2,271,187 | Fortescue et al. | Jan. 27, 1942 |
| 2,401,592 | Von Stocker | June 4, 1946 |
| 2,515,718 | Kroner | July 18, 1950 |

FOREIGN PATENTS

| 461,684 | Germany | May 5, 1926 |
| 609,844 | Great Britain | Oct. 7, 1948 |